(12) United States Patent
Hoehn et al.

(10) Patent No.: US 7,168,747 B2
(45) Date of Patent: Jan. 30, 2007

(54) DEVICE FOR GRIPPING AND HOLDING AN OBJECT IN A CONTACTLESS MANNER

(75) Inventors: Michael Hoehn, Sorsheim (DE); Juergen Hoeppner, Ratingen (DE)

(73) Assignee: Robert Bosch GmbH, Stuttgart (DE)

( * ) Notice: Subject to any disclaimer, the term of this patent is extended or adjusted under 35 U.S.C. 154(b) by 115 days.

(21) Appl. No.: 10/332,338

(22) PCT Filed: Apr. 5, 2002

(86) PCT No.: PCT/DE02/01238

§ 371 (c)(1),
(2), (4) Date: Nov. 25, 2003

(87) PCT Pub. No.: WO02/090222

PCT Pub. Date: Nov. 14, 2002

(65) Prior Publication Data

US 2004/0070221 A1  Apr. 15, 2004

(30) Foreign Application Priority Data

May 4, 2001  (DE)  ............... 101 21 742

(51) Int. Cl.
*A47J 45/00* (2006.01)
(52) U.S. Cl. ................... 294/64.3; 414/744.1
(58) Field of Classification Search ............... 294/64.2, 294/62.3, 64.3, 84.6; 414/744.1
See application file for complete search history.

(56) References Cited

U.S. PATENT DOCUMENTS

| 4,284,403 | A | | 8/1981 | Rey |
| 4,573,356 | A | * | 3/1986 | Barmatz et al. ............ 73/570.5 |
| 4,777,823 | A | | 10/1988 | Barmatz et al. |
| 5,096,017 | A | | 3/1992 | Rey et al. |
| 5,810,155 | A | | 9/1998 | Hashimoto et al. |
| 6,601,888 | B2 | * | 8/2003 | McIlwraith et al. ....... 294/64.3 |
| 6,609,874 | B2 | * | 8/2003 | Hoppner et al. ......... 414/744.1 |

FOREIGN PATENT DOCUMENTS

| DE | 198 06 306 | 9/1999 |
| DE | 199 16 922 | 10/2000 |
| JP | 61 136 818 | 6/1986 |
| JP | 06 249 640 | 9/1994 |

\* cited by examiner

*Primary Examiner*—Gene O. Crawford
*Assistant Examiner*—Esther Onyinyechi Okezie
(74) *Attorney, Agent, or Firm*—Kenyon & Kenyon LLP

(57) ABSTRACT

A device is proposed for the contactless grasping and holding of an object from a direction directed at least partially in the direction of the force of gravity, using a holding element situated counter to the direction of the force of gravity, at least partially above the object and at a distance from the latter, which to the greatest extent possible avoids the carrying off or migrating of particles that are possibly present. According to the present invention this is achieved in that the holding element is designed as a vibrating holding element for generating levitation waves.

14 Claims, 4 Drawing Sheets

DEVICE FOR GRIPPING AND HOLDING AN OBJECT IN A CONTACTLESS MANNER

FIELD OF THE INVENTION

The present invention relates to a device for the contactless grasping and holding of an object from a direction aligned in the direction of the force of gravity.

BACKGROUND INFORMATION

In the manufacturing of semiconductors, for example, and microsystems technology, numerous components are furnished at their surface with structures that are sensitive to the touch. Such components, among other things, have movable, filigree etching structures, such as diaphragms, reeds or jumpers, possibly as components for pressure sensors or acceleration sensors. In order to avoid impairment, this requires contactless grasping and holding of the component.

In addition, on account of a mechanical contact of grasping with the component surface, particles could be abraded or generated, and could possibly be carried off onto the component surface, which has a disadvantageous effect on the manufacturing yield.

Furthermore, components having sensitive surfaces or surface coatings, such as freshly lacquered components or the like in almost all technical fields, may likewise be grasped and held in a contactless manner.

In the case of certain applications, the component may only be grasped and held from above, i.e. the direction aligned with the direction of the force of gravity, for instance, when grasping a component that was laid down on a storage area or a transportation device, or when mounting or assembling the component on a specified object or storing it. Such cases of application exist, for example, in the bonding of semiconductor disks, or during so-called wafer bonding, in which case the corresponding component is to be applied accurately and with a defined contact pressure to a structural element without damaging corresponding structures or surfaces. In the case of these applications, no grasping or holding devices may be used which hold or grip the component from two opposite sides.

Such a one-sided, contactless grasper and holder is known, for instance, from German Published Patent Application No. 198 06 306. This document describes a device in which the respective object is positioned in the direction of the force of gravity, in a contactless manner, below a holding element, using pneumatic tractive forces and pressure forces.

However, this has the disadvantage that, in order to generate the pneumatic tractive and pressure forces, gas flows out from appropriate outflow orifices or is aspirated in inflow orifices, which may lead to particles being carried off, and thus to a loss in manufacturing yield.

SUMMARY OF THE INVENTION

By contrast, it is the object of the present invention to propose a device for the contactless grasping and holding of an object from a direction, preferably a direction aligned with the direction of the force of gravity, which to the greatest extent avoids the carrying off or migrating of particles that may possibly be present.

In this regard, the device according to the present invention has the distinction that the holding element is designed as a vibrating holding element for generating levitation waves.

Surprisingly, in practice it turns out that just one holding element positioned counter to the direction of gravity above the object, i.e. counter to the direction of sound propagation, which, in particular, generates acoustical levitation waves, is able to grasp and hold an object at an advantageous distance apart. In this instance, no second holding element has to be positioned on the side of the object lying opposite the vibrating holding element, such as, for example, a reflector or a second vibrating holding element for generating standing waves between the two holding elements.

Beyond that, it also turned out that the object to be held and grasped may have any desired, particularly three-dimensional form or geometry. Furthermore, using a device according to the present invention, floppy parts such as foils, diaphragms, papers, textiles or the like, fragile components such as glass elements, comparably thin semiconductor components or similar items, as well as surface-coated objects or components, having structures sensitive to the touch, may be grasped, held and positioned at their surface.

At this time, devices are already known which are able to hold and transport objects with the aid of the physical principle of so-called near field levitation (cf, for example, U.S. Pat. No. 5,810,155 or German Published Patent Application No. 199 16 922). However, it is common to these and comparable devices that the object to be held or transported is positioned above the vibrating holding element, i.e. that the vibrating holding element is situated below the object in the direction of gravity.

The technical world assumed up to now, among other things, that the object may only be pressed away from the vibrating supporting element because of the sound pressure of the levitation waves. In regard to this, known devices using the principle of acoustical near field levitation have been provided exclusively for applications in which extending below the object is implementable.

The possibility of extending below the object to be grasped and held is not necessary when using a device according to the present invention. As a consequence, according to the present invention it is possible to grasp and lift up an object, in a contactless manner, at a pick-up location exclusively from one side or rather from above, possibly to transport it over a certain distance and subsequently to position it at a deposit location designed in any desired manner. After publication of the present invention, one may assume that the technical world will subsequently supply the exact explanations required therefor.

The vibrating holding element is advantageously designed for decoupling ultrasound waves having frequencies between 16 kHz and 1 GHz., especially between 20 kHz and 40 kHz. With the aid of this measure, advantageous holding performances or rather holding forces may be implemented for grasping and holding the object. In an advantageous manner, adaptation of the frequencies is provided in dependence upon the object to be grasped and held. With this concept in mind, above all, an advantageous adaptation to the required procedural dynamics of each respective application case, such as the so-called "pick and place" task, may be implemented.

In one particular refinement of the present invention, a support surface of the holding element situated opposite the object, is adapted to the surface section of the object. In this case, the surface section of the object may have any desired, preferably three-dimensional shape, to which the support surface of the holding element is to be adapted.

A projection of the object onto a plane that is aligned nearly perpendicularly to the force of gravity may possibly correspond to the greatest extent possible to a projection of the support surface of the holding element of the corresponding plane. Hereby, in an advantageous manner, among other things, rotational securing or centering of the object is implemented on account of advantageous edge effects. Alternatively to this, the projection of the support surface of the holding element may be designed to be smaller than the projection of the surface section of the object that is positioned opposite to it.

These variants of the present invention above all make possible advantageous grasping and/or positioning of the object from and/or into a gap whose area largely corresponds to the respective projection of the object. For example, electrical or micromechanical components may be positioned in a gap between other components on a substrate, the gap approximately corresponding to the dimensions of the component. Thereby a comparatively high component density may possibly be implemented on appropriate substrates, which may lead to an advantageous miniaturization of the corresponding products.

For example, the three-dimensional adaptation of the support surface to the surface section takes place in such a way that the support surface, in addition to an appropriate distance from the object, is to be designed almost as the negative shape of the surface section. Thus, for example, in the case of a sphere as the object to be held, the support surface of the holding element may possibly be designed as a spherical half shell having a slightly larger diameter than the diameter of the sphere.

In addition, more complex three-dimensionally designed objects, such as freshly lacquered body parts in the automotive industry or the like, may be grasped or held in a contactless manner, and possibly be transported from a pick-up location and positioned and pressed onto a support, with the aid of support elements having an appropriately adapted complex three-dimensional support surface according to the present invention.

In an advantageous manner, an area of the surface section is positioned transversely to a vibrational direction of the support surface in this area. This ensures that the running direction of the levitation waves is aligned perpendicularly to the region of the object, which leads to an advantageous pick-up in the holding performance, and thus, comparatively heavy objects may be held or grasped.

In one preferred variant of the present invention, the support surface of the holding element has at least one opening of at least one recess of the holding element. In this connection, the opening and/or the recess may have any cross section or any desired shape.

While carrying out this measure, it was observed that greater holding forces for contactless grasping and holding the object may be implemented. This observation is based on the assumption that, in this process, the gas volume present in the recess is, among other places, sucked into the gap between the object and the holding element, so that underpressure may be created in the recess, which draws the object against the holding element or rather against the direction of the force of gravity. Thereby, particularly, an improved procedural dynamics of the device is implemented with respect to the object held. For instance, in this method, the holding element may achieve greater accelerations or procedural speeds.

Basically, the depth of the recess should be designed to be greater than the width of the opening, whereby the recess has a comparatively large volume and, at the same time, a comparatively large support surface may be implemented. The recess should possibly be designed to be open at its end opposite to the opening of the support surface.

The recess is formed preferably as a bore, especially a blind end bore. A corresponding bore may be applied in an advantageous manner to the holding element without great effort, so that the manufacturing cost for a holding element having one or more recesses may be minimized.

In one particular further development of the present invention, at least one additional force generating unit is provided for generating additional force directed counter to the force of gravity. For this, for example, magnetic, electrostatic, electrodynamic, pneumatic or comparable forces may be generated using the appropriate force generating units. In this connection, too, the force generating unit is advantageously positioned counter to the direction of gravity, above the object.

The force generating unit is preferably designed as a pressure generating unit, above all as an underpressure generating unit, particularly having at least one suction element for drawing in the object. Using this measure, a contactless grasping and holding of the object may be implemented, with the aid of tractive forces directed counter to gravity, which leads to a further improvement of the procedural dynamics of the device in the case of an object held according to the present invention. For certain application cases, in an advantageous way a plurality of aspirating elements may be used so as to increase the tractive forces.

The suction element for drawing in the object may, for example, be designed as a ring nozzle positioned around the holding element, as a simple suction nozzle positioned on the holding element and/or as a suction nozzle at a distance from the holding element. In the last-named case, this is particularly advantageous if the surface section of the object is substantially larger than the support surface of the holding element.

In addition, the suction element may be integrated into the holding element. The pressure generating unit is preferably situated at the open end of the recess that lies opposite the opening of the support area. Thereby, in a relatively simple manner, the integration of the suction element into the holding element may be implemented, since the recess is simultaneously used as the suction element.

The pressure generating unit is preferably connected to the vibrating holding element by the use of proven vibration-insulated connectors, such as to the open end of the recess, or to especially provided suction elements vibrating along with the holding element.

In one preferred variant of the present invention, a fixing unit is provided for fixing the object transversely to the direction of gravity. By doing this, both a lateral centering and a rotational securing of the floating object may be implemented, so that, for example, a lateral sliding off of the object, caused, for example, by forces of inclination or acceleration, is effectively prevented. The lateral centering and/or rotational securing may be carried out using a plurality of possibilities already known. For instance, fixed or movable stops or the like may be used.

A fixing unit is used in an advantageous manner, which is designed for contactless fixing of the object. In this variant of the present invention, one or more fixing elements are used, for example, which are designed as a suction nozzle and/or a pressure nozzle or the like.

Advantageously, a vibrating fixing element of the fixing unit is provided for generating levitation waves. In this connection, the fixing element may be designed corresponding to the holding element for generating levitation waves, possibly according to the principle of near field levitation. In addition, fixing with the aid of vibrating fixing elements may be implemented, which makes possible the formation of a standing wave between the fixing elements.

In a preferred manner, the vibrating holding element may be designed at the same time as a fixing element, one or more fixing elements, for example, being integrated into the holding element and/or, with the aid of integrated fixing elements, the holding element is designed for the formation of different amplitudes of the holding element which decrease toward the edge of the holding element.

In general, with the aid of the adaptation of the support surface of the holding element, at the surface section of the object, a fixing of the object transversely to the direction of gravity may be implemented at the same time. During experiments it has been shown that a contactless self-centering of the object occurs in response to extensive conformity in the geometry, particularly of sections of the edge areas, of the support area of the holding element to the geometry, particularly sections of the edge regions of the surface section of the object. Because of this, one may possibly do without additional fixing elements, which especially reduces the construction cost of the device according to the present invention.

In one preferred variant of the present invention, a plurality of holding elements and/or fixing elements is provided. With the aid of this measure, for example, several holding elements each having a comparatively small support surface, may be distributed particularly evenly over the surface section of the object facing towards the holding elements. In general, a plurality of vibration sources may be positioned at one and/or several holding elements.

These variants make possible particularly grasping and holding relatively large objects, which may possibly have a comparatively complex three-dimensional geometry, as well as possibly lateral centering of the object. Above all, for the lateral centering of the object, a plurality of holding elements may advantageously be situated in corner or edge regions of the object. In this connection, preferably extensive agreement of sections of the edge regions of the holding elements and of the object is provided.

In the case of these variants, the holding elements and vibration sources are to be positioned in such a way that the vibrational direction of the holding element, in the region of the surface section lying opposite the object, is aligned perpendicular with respect to this region. Thereby, in an especially simple manner, the adaptation of the support surfaces, above all to complex surface sections of the object, may be implemented.

In addition, in an advantageous manner, a suction element may be positioned between several vibrating holding elements. If necessary, even a plurality of suction elements may be provided for the use of one or more holding elements.

In general, it is also conceivable that possibly several holding elements and/or fixing elements may be positioned along a predefined transportation route, the object being positioned in the direction of gravity below the holding element(s), freely floating according to the present invention. In this connection, the object is advantageously induced to move along the transportation route using proven and known methods. Advantageously, the movement of the object is realized using suction elements arranged at an angle to the transportation direction.

Alternatively to this, the holding element is designed, movable especially vertically and/or horizontally with the aid of at least one lifting arm and/or tilting arm, so that in an advantageous manner the object may execute a defined change in position from a pick-up location to a lay-down location.

Generally, the feedback of the object or holding element to the vibration generator, for example, the power consumption, may be ascertained and evaluated using an appropriate evaluation unit, so that hereby in an advantageous manner it may be determined whether the object is being held by the device or not, and how much force is being applied to the object in a contactless manner. This measure makes possible an advantageous control of grasping and holding, as well as of positioning of the object and, for example, of the forces when pressing on. In a preferred manner, the power consumption of the object is ascertained by recording an electrical voltage and an electrical current of a piezoelectric vibration generating unit.

DETAILED DESCRIPTION

Figure 1:
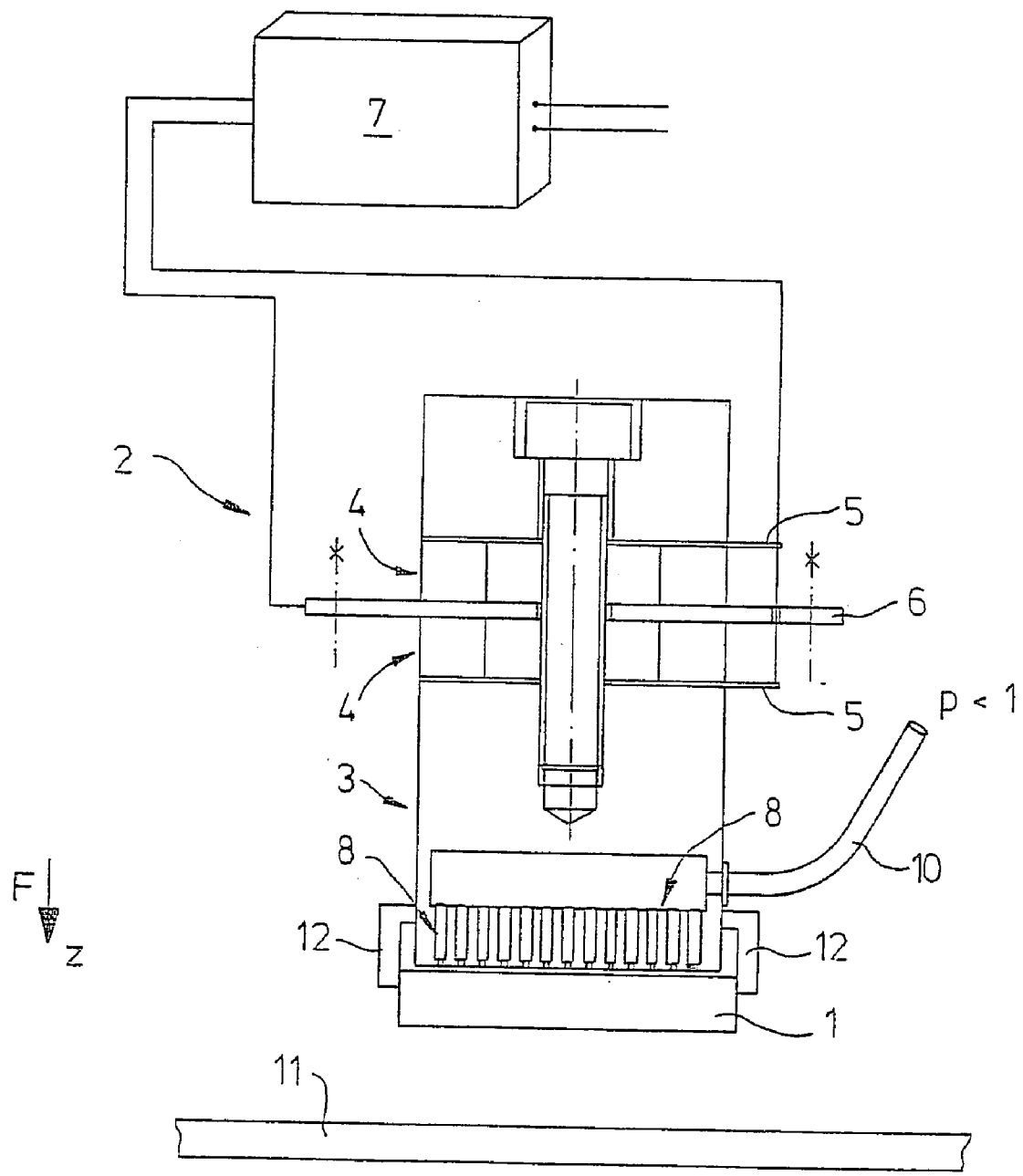
FIG. 1 shows a schematic view of the device according to the present invention.

In FIG. 1 a schematic design of a device according to the present invention is shown, for the contactless grasping and holding of an object 1, such as a chip 1. However, in the case of object 1, other fragile, floppy and/or surface sensitive components may be involved, such as paper, textiles, diaphragms, foils, microsystem technology component parts, semiconductor elements, toxic and contaminated objects or objects otherwise dangerous to human beings, above all of the chemical or pharmaceutical industry, comparatively hot and/or cold elements, freshly lacquered objects, especially in the automotive industry, or other technical applications, glass substrates in the manufacturing of flat screens or the like.

A unit 2 for generating ultrasound vibrations includes for this a sonotrode 3, piezo elements 4, connectors 5, a nodal plate 6 as well as control electronics 7.

Sonotrode 3 is thereby stimulated to vibrate, so that it may generate or decouple ultrasound levitation waves for contactless grasping and holding chip 1.

According to the present invention, chip 1 is situated underneath sonotrode 3, in direction z of force of gravity F.

In the variant of the present invention as in FIG. 1, sonotrode 3 has a plurality of bores 8 which open out into a collecting main 9 and are connected to a vacuum pump (not shown in detail) via a vibration-insulated connecting line 10. With the aid of a pressure generating unit that is not shown in detail, in particular an underpressure p is generated for generating a pneumatic tractive force directed counter to force of gravity F. This pneumatic tractive force improves the grasping and holding of chip 1 with the aid of the device according to the present invention.

In addition, in FIG. 1 it becomes clear that the device according to the present invention is designed for grasping and holding a chip 1, chip 1, for example, being grasped from a support 11 and laid down on it again without holding elements having to be provided for this purpose on the side of support 11 lying opposite the device.

In addition, two mechanical stops 12 are shown in FIG. 1 for the lateral fixing of chip 1. In certain application cases, mechanical touching of the edge regions or the sides and/or parts of the underside of object 1, that is to be grasped and held, may be tolerated, above all between lifting it and laying it down.

Figure 2:
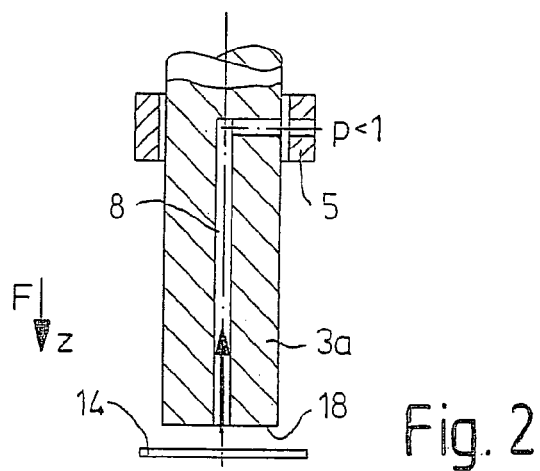
FIG. 2 shows a schematic cross section through a holding element according to the present invention having an integrated suction boring.

FIG. 2 schematically shows a sonotrode 3a having only a suction bore 8. Suction bore 8 is connected to a vacuum pump via a vibration-insulated connector 5, in a manner not shown in detail. Sonotrode 3a vibrates, for example, at an ultrasound frequency of 20 to 40 kHz, so that a component 14 is to be grasped and held in a contactless manner counter to direction z of force of gravity F, beneath vibrating head 3a.

Figure 3:
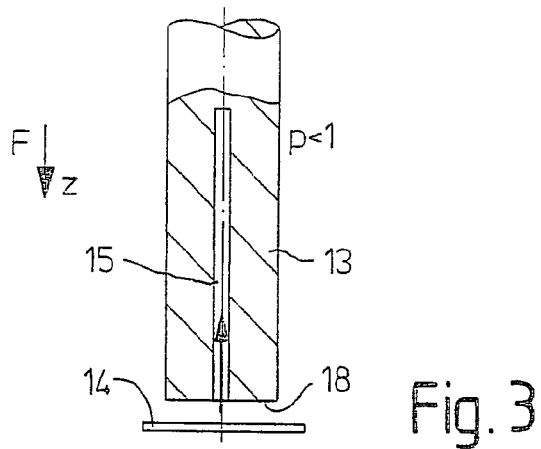
FIG. 3 shows a schematic cross section through a further holding element according to the present invention having a blind-end bore.

FIG. 3 schematically shows a sonotrode 13 having a blind-end bore 15. In a grasping and holding phase, before anything else, according to the present invention, sonotrode 13 is set to vibrating at a frequency of 20 to 40 kHz, so that component 14 is held underneath sonotrode 13, as seen in direction z of force of gravity F.

Figure 4:
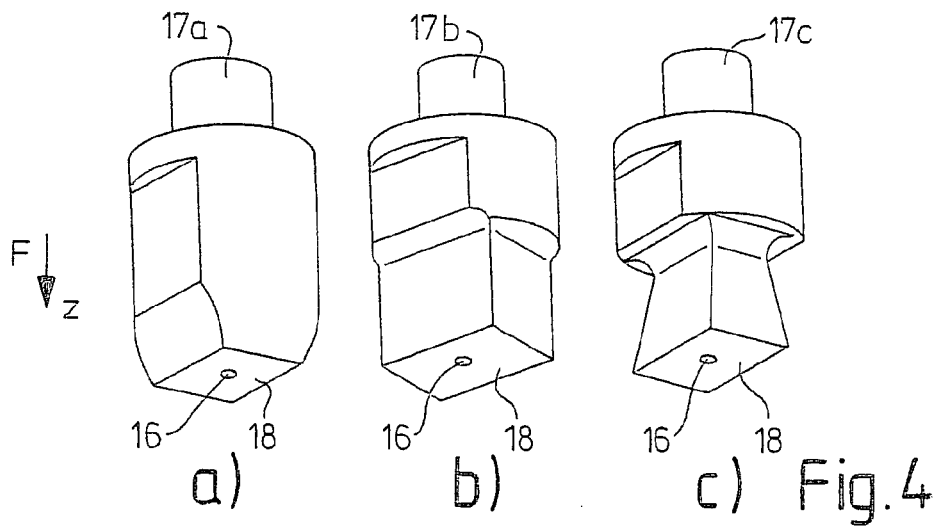
FIG. 4 shows different variants shown in perspective of further holding elements according to the present invention.

According to FIG. 4, the most varied shapes or embodiment possibilities of sonotrodes 17a, 17b, 17c are advantageous. In this connection, support surfaces 18 are adapted, for example, to a component not shown in detail. Support surfaces 18 closely approximate a surface section of a component facing support surface 18, such as a sensor chip. Like support surfaces 18, the sensor chip not shown also has a rectangular cross sectional surface. With the aid of this measure, a contactless self-centering, including a rotational securing of the component not shown, is able to be implemented underneath sonotrodes 17a, 17b, 17c.

Basically, the lateral centering of sonotrode 17c is better than that of sonotrode 17b, and it, in turn, is better than that of sonotrode 17a. For this, probably, advantageous edge effects or flow profiles at the edge of support surfaces 18 are of importance.

Furthermore, FIG. 4 shows openings 16, to be optionally provided, of recesses not shown, which, for instance, may be designed as bore 8 or blind-end bore 15.

Figure 5:
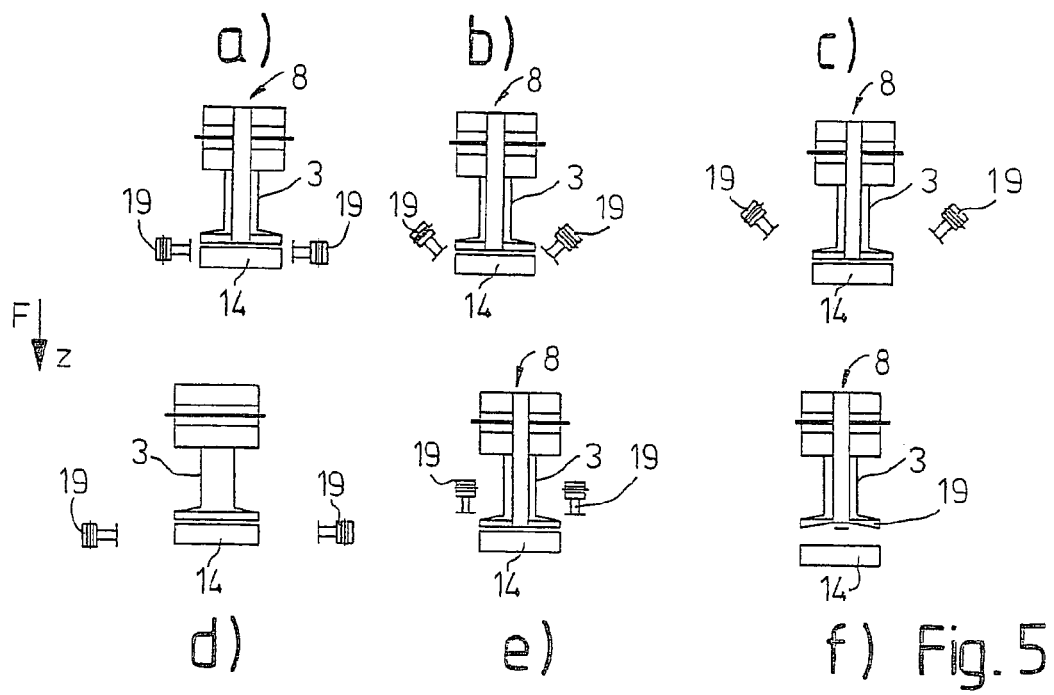
FIG. 5 shows various schematically shown devices according to the present invention having contactless ultrasound lateral centering.

FIG. 5 shows the most varied methods or rather, devices according to the present invention, having contactless ultrasound lateral centering. In this connection in particular, a device is used having a sonotrode 3 following the device as in FIG. 1.

Compared to the device in FIG. 1, in the variants as in FIG. 5 a lateral centering of component 14 is implemented, using a vibrating fixing element 19. In FIG. 5a as well as 5b, the centering is carried out according to the principle of acoustical near-field centering, fixing elements 19 being able to be integrated into sonotrode 3, if necessary.

According to FIG. 5c, the centering takes place by holding component 14 in the first node of the vibrational waves. In FIG. 5d, the fixing of component 14 takes place using a standing wave, not shown, in particular, two opposite fixing elements 19 being supposed to be used, two vibrating or one vibrating and one reflecting fixing element 19 being able to be provided.

The lateral centering according to FIG. 5e takes place by the Bernoulli effects of an outside standing wave, with the aid of fixing elements 19, the latter being able to be integrated into sonotrode 3, if necessary.

According to FIG. 5f, the centering of component 14 may be implemented with the aid of different amplitudes of sonotrode 3, the amplitudes diminishing radially outwards. Fixing element 19 is, in this connection, being integrated in particular in the end region of sonotrode 3.

Figure 6:
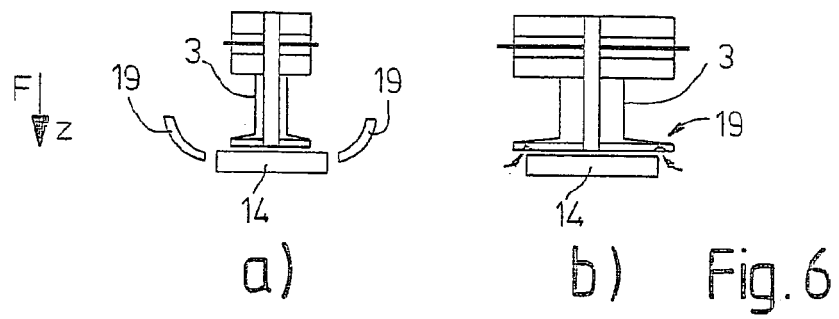
FIG. 6 shows various schematically shown devices according to the present invention, having contactless aerostatic lateral centering.

FIG. 6 shows further variants for the contactless centering of components 14, the centering taking place by using pneumatic blowing-in according to FIG. 6a or by self-centering on account of a ring nozzle or by Bernoulli effects.

Figure 7:
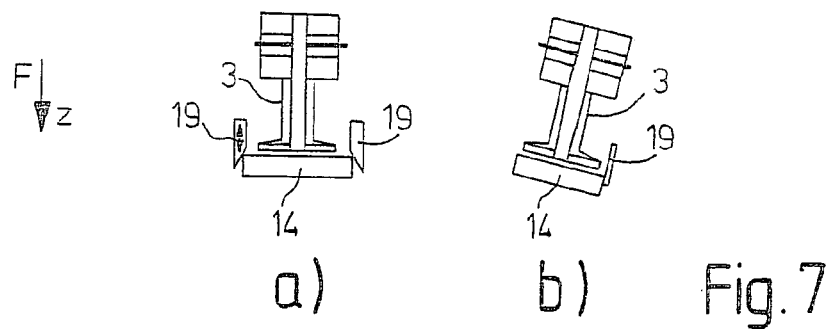
FIG. 7 shows various schematically shown devices according to the present invention, having mechanical contact lateral centering.

FIG. 7 shows mechanically tactile fixing elements 19 for fixing component 14.

Figure 8:
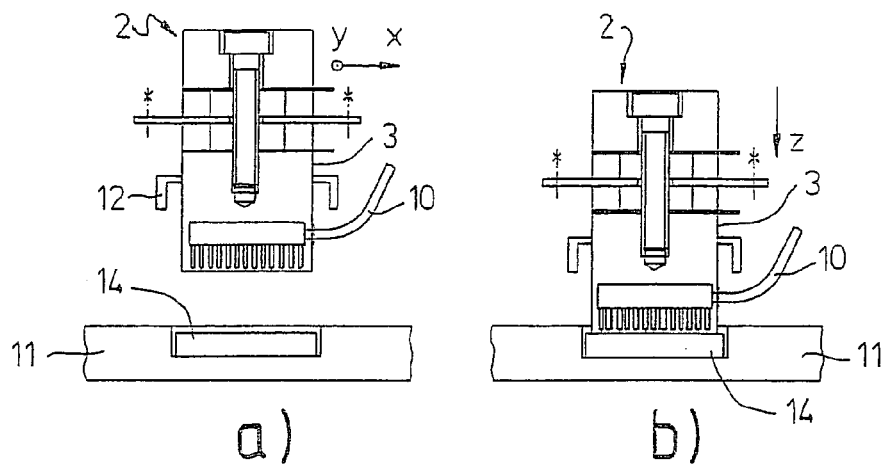
FIG. 8 shows various working steps in a pick-up procedure or a lay-down procedure using a device according to the present invention, shown schematically.
Figure 8:
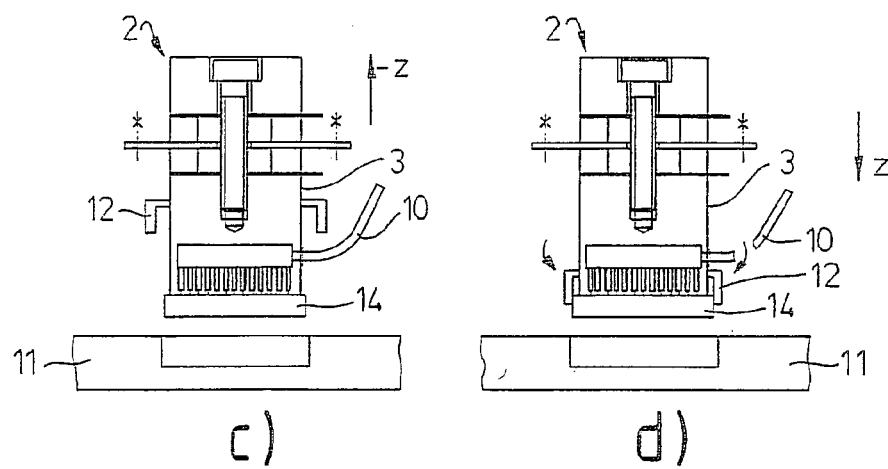
Figure 8:
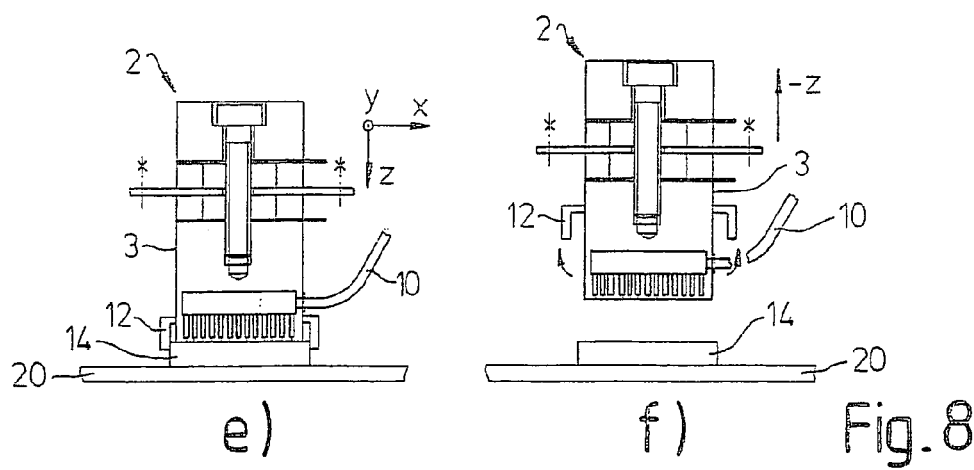

FIG. 8 shows schematically a pick-up procedure and a lay-down procedure of a component 14, using a device according to the present invention. According to FIG. 8a, the device is positioned, according to FIG. 1, over a component 14 which is present in a so-called chip tray, the chip tray forming at the same time support 11 of component 14.

Subsequently, according to FIG. 8b, component 14 is grasped in a contactless manner using vibrating head 3, and according to FIG. 8c it is lifted from support 11. Almost simultaneously, or rather immediately thereafter, the centering of component 14 takes place according to FIG. 8d, by the moving of stops 12 in direction z and along a direction x, so that component 14 is secured against slipping sideways.

In a manner not shown, there follows the transportation of unit 2, having component 14, in direction x and/or direction y away from support 11, on to a substrate 20. At a specified location, unit 2 is positioned above substrate 20, and subsequently there takes place a force-regulated, contactless assembling of component 14 onto substrate 20. In this connection, in an advantageous manner, the progressive increase in carrying force counter to direction z is used, in dependence (not shown) on the distance between component 14 and sonotrode 3 for generating a contact pressure force, directed onto substrate 20, of from a few milliNewtons to a few 1000 kiloNewtons. Finally, the lifting off of switched-off unit 2 takes place, in direction -z, according to FIG. 8f.

What is claimed is:

1. A device for achieving a contactless grasping and holding of an object from a direction directed at least partially in a direction of the force of gravity, comprising:

a holding element situated counter to the direction of the force of gravity, at least partially above the object and at a distance therefrom, wherein:

the holding element includes a vibrating holding element for generating a levitation wave caused by at least one sound source that acts on the object, wherein no second holding element or reflector is arranged on a side of the object opposite to the holding element.

2. The device as recited in claim 1, wherein:

the vibrating holding element generates an ultrasound wave having a frequency between 16 kHz and 1 GHz.

3. The device as recited in claim 1, wherein:

a support surface of the vibrating holding element situated opposite the object is adapted to a surface section of the object.

4. The device as recited in claim 3, wherein:
an area of the surface section is situated transversely to a vibrational direction of the vibrating holding element in the area.

5. The device as recited in claim 3, wherein:
the support surface includes at least one opening of at least one recess.

6. The device as recited in claim 5, wherein:
the at least one recess includes a bore.

7. The device as recited in claim 1, further comprising:
at least one additional force generating unit for generating an additional force directed counter to the force of gravity.

8. The device as recited in claim 1, wherein:
the at least one additional force generating unit includes a pressure generating unit.

9. The device as recited in claim 1, wherein:
the pressure generating unit includes at least one suction element to draw in the object.

10. The device as recited in claim 5, further comprising:
a pressure generating unit situated at one end of the at least one recess lying opposite the at least one opening.

11. The device as recited in claim 1, further comprising:
a fixing unit for fixing the object arranged transversely to the direction of the force of gravity.

12. The device as recited in claim 11, wherein:
the fixing unit achieves a contactless fixing of the object.

13. The device as recited in claim 11, wherein:
the fixing unit includes a vibrating fixing element that generates the levitation wave.

14. A method for achieving a contactless grasping and holding of an object from a direction directed at least partially in a direction of the force of gravity, comprising:
using at least one holding element including a vibrating holding element and situated counter to the direction of the force of gravity, at least partially above the object and at a distance therefrom, in order to generate a levitation wave caused by at least one sound source that acts on the object, wherein no second holding element or reflector is arranged on a side of the object opposite to the holding element.

\* \* \* \* \*